US006266326B1

(12) United States Patent
Harsanyi

(10) Patent No.: US 6,266,326 B1
(45) Date of Patent: Jul. 24, 2001

(54) APPARATUS FOR LOOP TESTING IN A COMMUNICATION SYSTEM

(75) Inventor: Stephen R. Harsanyi, Succasunna, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/055,471

(22) Filed: Apr. 6, 1998

(51) Int. Cl.[7] ............................. G08C 15/20; H04M 1/24
(52) U.S. Cl. ....................... 370/248; 370/244; 370/247; 370/251; 370/252; 379/5
(58) Field of Search ................................. 370/241, 247, 370/248, 249, 251, 244, 250, 252; 379/5

(56) References Cited

U.S. PATENT DOCUMENTS

| | | | |
|---|---|---|---|
| 5,181,106 | * | 1/1993 | Sutherland .............................. 358/86 |
| 5,301,050 | * | 4/1994 | Czerwiec et al. ..................... 395/110 |
| 5,361,293 | * | 11/1994 | Czerwiec ............................... 379/27 |
| 5,572,347 | * | 11/1996 | Burton et al. ......................... 359/124 |

* cited by examiner

Primary Examiner—Huy D. Vu
Assistant Examiner—Toan Nguyen
(74) Attorney, Agent, or Firm—Steve Mendelsohn

(57) ABSTRACT

The present invention provides a test access path (TAP) concentration function. The apparatus supports subscriber loop testing for special access configurations (e.g., fiber-to-the-curb (FTTC)), where network units are physically clustered together into two or more non-collocated clusters. The apparatus supports test access to twisted wire pair subscriber loops, the lengths of which vary over a wide range. In one embodiment, the apparatus is a TAP expander that connects the TAP of an integrated digital terminal of a local digital switch with a derived TAP corresponding to one of the ONU clusters. The present invention allows an integrated digital terminal with as few as one test access path to be configured in a network having two or more non-collocated network unit clusters (e.g., ONU clusters), thereby supporting loop testing for all of the subscriber loops served by the integrated digital terminal without unnecessarily limiting the number of those subscriber loops.

33 Claims, 4 Drawing Sheets

APPARATUS FOR LOOP TESTING IN A COMMUNICATION SYSTEM

BACKGROUND OF THE INVENTION

1. Field of the Invention

The present invention relates to communications, and, in particular, to loop testing for communication systems.

2. Description of the Related Art

General Description of an Integrated Digital Loop Carrier Architecture

The generic requirements that describe the overall system functions, performance, and operation for a digital loop carrier (DLC) system when integrated into a local digital switch (LDS) are given in Bellcore Generic Requirements, GR-303-Core, "Integrated Digital Loop Carrier System Generic Requirements, Objectives, and Interface," Issue 1, September 1995, plus Revision 2, December 1996, (A Module of TSGR, FR-NWT-000440). These requirements specify one particular way to interface a DLC remote digital terminal (RDT) with an LDS. The requirements for such integrated digital loop carrier (IDLC) systems are expressed in terms of functions that the combined remote digital terminal and local digital switch shall have when connected together. The interface defined by the cited Bellcore documents is commonly referred to as a TR-303 interface.

FIG. 1 shows a block diagram of an integrated digital loop carrier system 100 conforming to the TR-303 interface requirements. IDLC system 100 comprises an integrated digital terminal (IDT) 104, which is part of a local digital switch 102, and a remote digital terminal 106. The digital transmission facilities (DTF) 105 carry communication signals between local digital switch 102 and remote digital terminal 106. The DTF can be either metallic or fiber. The TR-303 interface requirements specify that the IDLC system shall have at least one test access path (TAP) 108, which is a metallic or a metallic-like connection from the integrated digital terminal to the remote digital terminal used for subscriber loop testing. A test access path provides DC continuity from the local digital switch to the loop 109 to the subscriber 110. The terms "loop" and "line" are used interchangeably in this specification. It may be, but is not necessarily, implemented as a copper pair. At the remote digital terminal, an individual subscriber loop (e.g., 109) can be switched to the test access path for testing. This arrangement provides a test path all the way from the local digital switch to the subscriber 110.

Remote digital terminals, such as RDT 106 in FIG. 1, are deployed either in the outside plant (e.g., in cabinets, controlled environment vaults (CEVs), or telephone huts) or on customer premises. The specification for a remote digital terminal allows it to support a large number of lines (up to 2048 subscriber lines that can vary in length over a wide range). Thus, the cost associated with a test access path is shared across this large number of lines. Because test access paths are costly to implement and maintain, some local digital switches support only one test access path per TR-303 interface (e.g., 112 in FIG. 1). Because the loop-testing algorithms used by the loop testing system 103 to determine if a fault exists and, if one does exist, where it is located (i.e., distance to fault), have to accommodate a wide range of line lengths, they are very complex.

Loop Testing in an IDLC System

In an integrated digital loop carrier system, such as IDLC system 100 of FIG. 1, loop testing is implemented under the control of a loop testing system, such as loop testing system 103 of FIG. 1. A loop testing system typically comprises hardware, software, and databases designed and used to control loop testing of individual subscriber loops, such as loops 109 of FIG. 1. Loop testing in an integrated digital loop carrier system is implemented as follows:

(1) The loop testing system, using the subscriber telephone number as a test address, sends a test request to the local digital switch. This initiates the following sequence.

(2) Optional test of the test path between the local digital switch and the remote digital terminal.

The local digital switch runs a diode test to determine the integrity of the test path between it and the remote digital terminal. In response to the request for the diode test from the local digital switch, the remote digital terminal terminates the test access path with a diode/resistor circuit. The local digital switch recognizes this termination, thus determining that the test access path connection to the remote digital terminal is intact.

The local digital switch then sends a message to the remote digital terminal to release the diode/resistor termination from the test access path, thus completing the diode test.

(3) The local digital switch sends a message to the remote digital terminal to begin the setup sequence for the test path. This alerts the remote digital terminal of a test request.

(4) When the local digital switch sends a message to the remote digital terminal to connect the test access path, the remote digital terminal connects the test access path to the channel unit (CU) under test (114 in FIG. 1), and instructs the channel unit to connect the test access path to the subscriber loop 109. This completes the test path from the loop testing system to the subscriber.

(5) The loop testing system then runs its loop tests.

(6) After completion of the loop tests, the local digital switch sends a message to the remote digital terminal to disconnect the test access path.

(7) The remote digital terminal then releases the test access path connection to the channel unit and instructs the channel unit to disconnect the subscriber loop from the test access path and to reconnect the subscriber loop to the channel unit's line circuit. This completes the loop test session.

Fiber-to-the Curb Architecture

FIG. 2 shows a block diagram of a fiber-to-the-curb (FTTC) system 200. In an FTTC system, the remote digital terminal (e.g., RDT 106 in FIG. 1) is replaced by a host digital terminal (HDT) 216. The host digital terminal can be deployed either in the central office (CO) or in the outside plant (e.g., in cabinets, controlled environment vaults, or telephone huts). Subtending from the host digital terminal and connected to it by optical fibers 217 are one or more optical network units (ONUs) 206, where at least some of the ONUs may be separated from one another by significant distances (i.e., non-collocated). An optical network unit houses the various channel units 214 that provide service to the subscribers 210. The digital transmission facilities (DTF) 205, which can be either metallic or fiber, carry communication signals between the local digital switch 202 and the host digital terminal 216. When the host digital terminal is located in the central office, the digital transmission facilities are usually metallic. When the host digital terminal is located in the outside plant, the digital transmission facilities are fiber and the host digital terminal extends the fiber connection from the local digital switch all the way to the optical network unit. The fiber-to-the-curb architecture allows the ONU electronics (i.e., the subscriber interface) to be placed closer to the subscribers. The optical network units are generally placed 500 feet or less from the subscriber and support a small number (e.g., 12, 24, or 48) of subscriber loops 209. This FTTC architecture eliminates long copper subscriber loops and the problems associated with them. However, it creates a problem for loop testing.

Typical integrated digital terminals, such as IDT 204 of FIG. 2, support a limited number (e.g., three) of test access paths 208, with some IDTs supporting only one TAP. Furthermore, an integrated digital terminal may be unaware of the existence of the host digital terminal and the multiple non-collocated optical network units in an FTTC architecture. The integrated digital terminal "thinks" the host digital terminal is a remote digital terminal. As such, loop testing cannot be performed using the IDLC model of FIG. 1. Even if the integrated digital terminal could support a sufficient number of test access paths, it may be cost prohibitive to run a test access path to each non-collocated optical network unit due to the small line size supported there. To address these problems, Lucent Technologies developed a method of loop testing for FTTC systems that is transparent to the local digital switch and to the loop testing system of the IDLC model. This method takes advantage of the fact that the subscriber loops 209 in an FTTC system are relatively short and therefore require only a basic set of simplified fault detection tests. This set of tests is implemented by a test head 218 located in the optical network unit that uses simple test algorithms and reports the results of the tests to the host digital terminal. The host digital terminal presents a set of resistive signatures to the test access path, each of which corresponds to a pass/fail result of a specific test.

SUMMARY OF THE INVENTION

Telecommunication service providers who are deploying architectures such as FTTC architectures have found applications where they want to serve a relatively large number (e.g., 480) of subscribers from optical network units that are closer to the host digital terminal. In such applications, the service provider would cluster a number of ONUs in a cabinet or other outside-plant enclosure to get the desired line count, thereby creating the equivalent of a small-line-size remote digital terminal. Such service providers want to support non-collocated clusters of ONUs and any stand-alone ONUs from a single host digital terminal. The clustered ONU applications would have the long loops associated with the standard integrated digital loop carrier (IDLC) model of FIG. 1. Therefore, the loop-testing method for the stand-alone ONU FTTC application of FIG. 2 would no longer work for clustered ONUs. A method similar to the one used for the standard IDLC model of FIG. 1 with one test access path to each cluster of ONUs is needed.

Since some integrated digital terminals support as few as one test access path per host digital terminal, extending the test access path from the integrated digital terminal to an ONU cluster limits the number of clusters that can be supported on a TR-303 interface to one. Unless the ONU cluster is very large, such an arrangement will be prohibitively costly. In certain applications, cluster sizes may be as small as 480 lines. Supporting loop testing for only one ONU cluster would mean that only 480 lines could be served from a TR-303 interface rather than the 2048 lines for which it was specified.

The present invention is directed at a scheme that allows an integrated digital terminal with as few as one test access path to access multiple ONU clusters on the same host digital terminal for loop testing. In one embodiment, the present invention relies on a device referred to as a test access path (TAP) expander. The TAP expander allows a single integrated digital terminal and its TAP output to be connected to n derived TAP outputs. Each derived TAP output is connected to an ONU cluster. This allows loop testing of each ONU cluster to work just like standard IDLC loop testing. The TAP expander is transparent to the local digital switch and to the loop testing system, and is compatible in full with current IDLC methods and procedures for loop testing. It can be used for any system architecture supporting clustered ONUs or other types of clustered network units (NUs) served by a host digital terminal.

The TAP expander is also compatible in full with a single host digital terminal that can support both the stand-alone ONU architecture of a conventional FTTC system as well as a system having clusters of ONUs, as long as the host digital terminal can determine which test method is to be used for a given ONU.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 3:
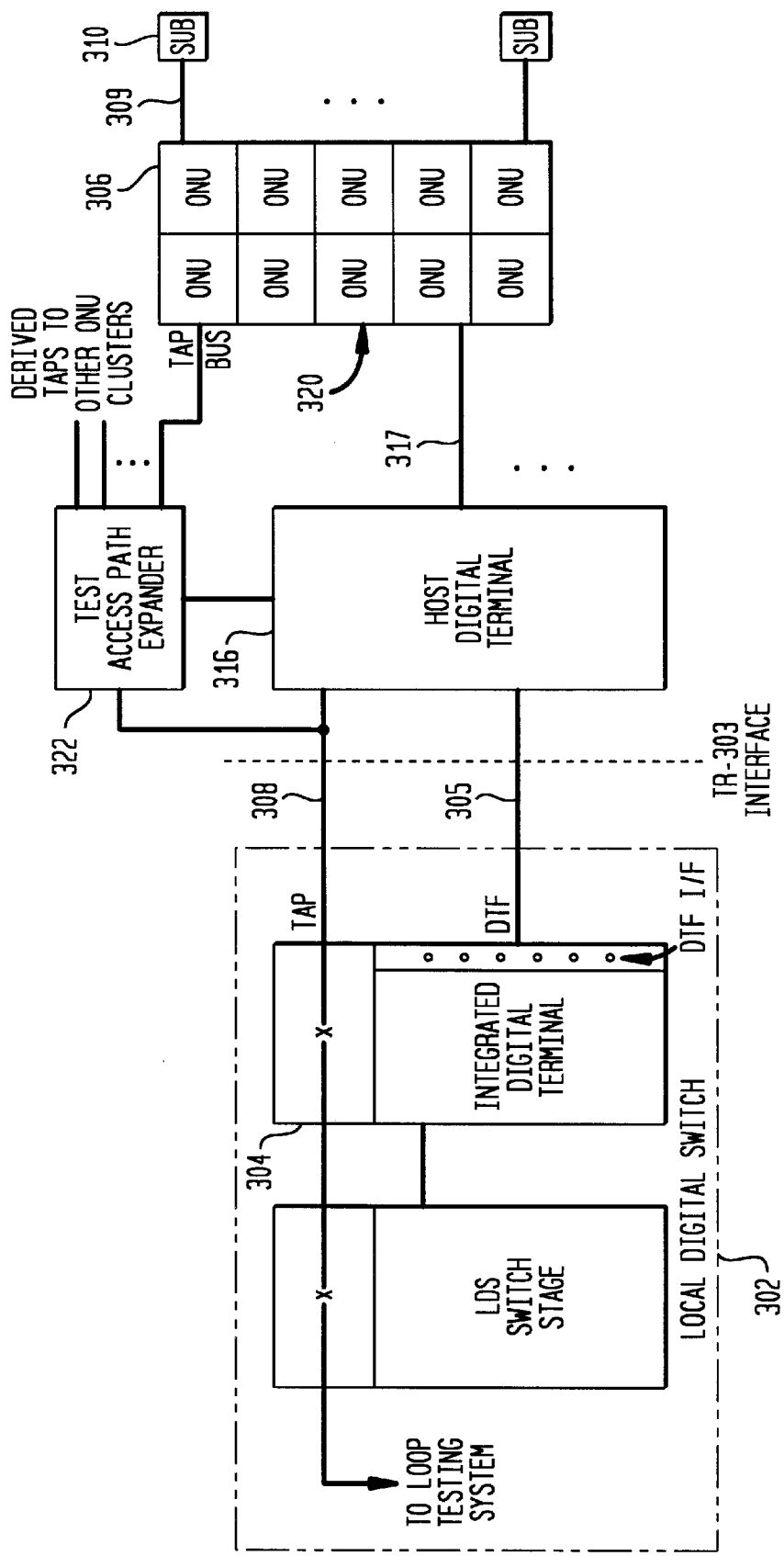
FIG. 3 shows a block diagram of the use of a TAP expander in a communication system, according to one embodiment of the present invention.

FIG. 3 shows a block diagram of the use of a test access path (TAP) expander in a communication system 300, according to one embodiment of the present invention. According to this embodiment, host digital terminal 316 is connected to n (possibly non-collocated) optical network unit clusters 320, where each ONU cluster comprises a number of collocated ONUs 306 supporting multiple subscribers 310 over corresponding subscriber loops 309. Communication signals between local digital switch 302 and host digital terminal 316 are transmitted over digital transmission facilities (DTF) 305, which can be either metallic or fiber, while communication signals between HDT 316 and each ONU cluster 320 are transmitted over fiber facilities 317. In addition, a test access path expander 322 provides an interface between test access path 308 of integrated digital terminal 304 and each of the ONU clusters 320 for loop testing. FIG. 3 shows only one ONU cluster 320 with some of its associated subscribers 310.

Figure 4:
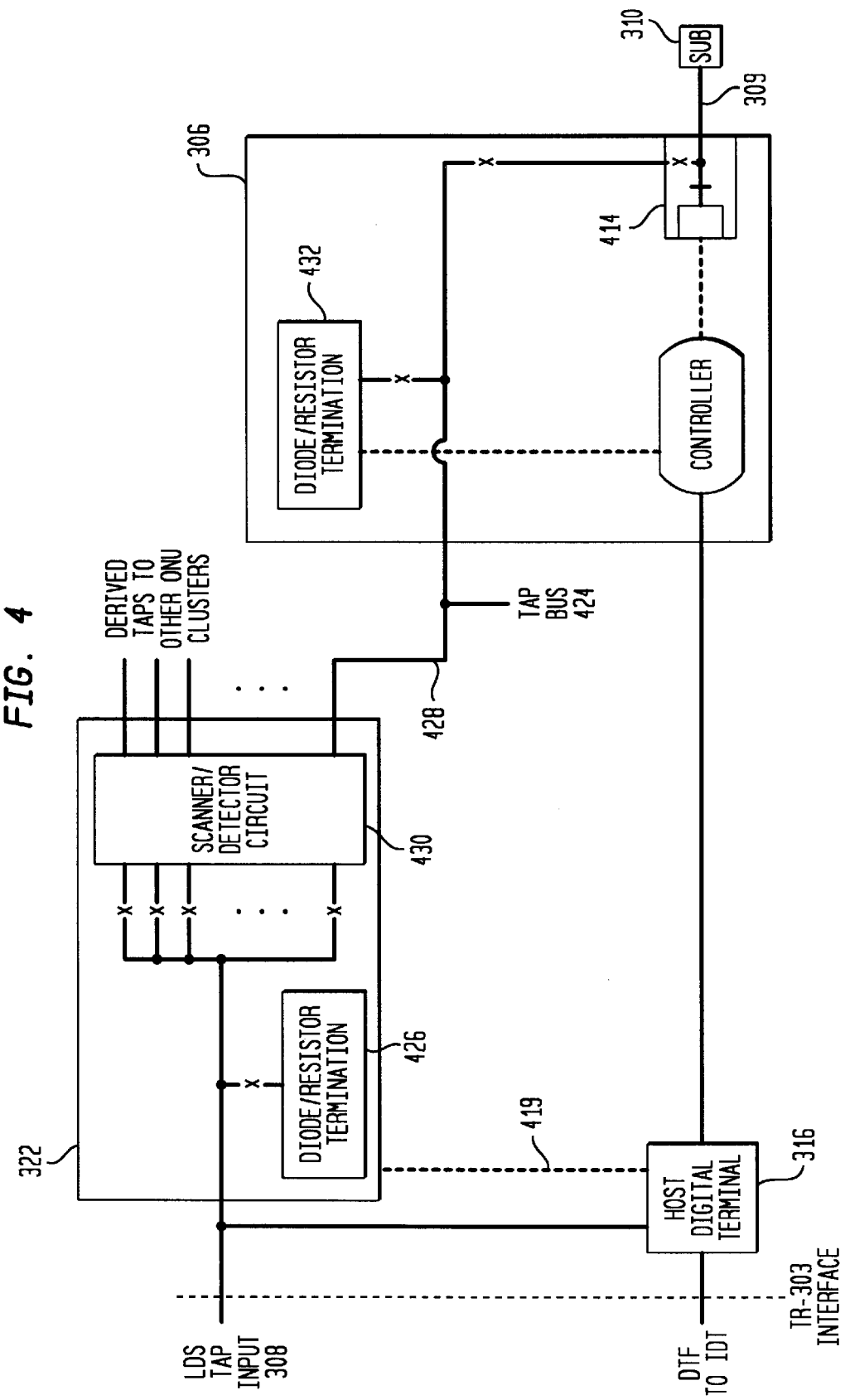
FIG. 4 shows a block diagram of a test access path expander as configured with a host digital terminal and one of the optical network units of FIG. 3, according to one embodiment of the present invention.

FIG. 4 shows a block diagram of test access path expander 322 of FIG. 3 configured with host 25 digital terminal 316 and one of the optical network units 306 of an ONU cluster, according to one embodiment of the present invention. TAP expander 322 operates as a switch to connect the test access path 308 of the local digital switch to any one of the ONU clusters supported by the host digital terminal 316. Connection to the individual ONUs 306 in an ONU cluster is made via a TAP bus 424 within the ONU cluster.

TAP expander 322 provides the following functions:

Provides a diode/resistor termination (426) used for the local digital switch diode test.

Scans for and detects the application of a diode/resistor termination (432) by an ONU across the derived test access path (428).

Switches the detected derived TAP to the local digital switch TAP.

Inhibits all other derived TAPs from switching to the incoming local digital switch TAP.

Releases the derived TAP from the incoming local digital switch TAP at the completion of the loop test and returns all derived TAPs to the scan/detect state.

Loop testing is implemented by the following operational scenario:

(1) The loop testing system, using the subscriber telephone number as a test address, sends a test request to the local digital switch. This initiates the following sequence.

Figure 1:
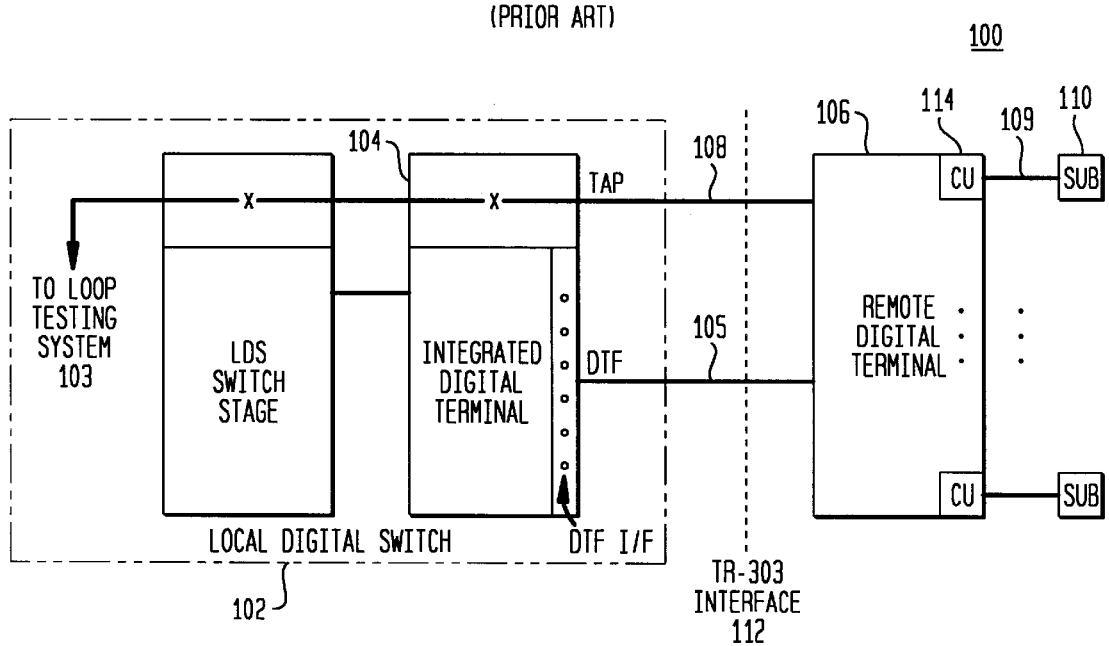
FIG. 1 shows a block diagram of an integrated digital loop carrier system conforming to the TR-303 interface requirements.
Figure 2:
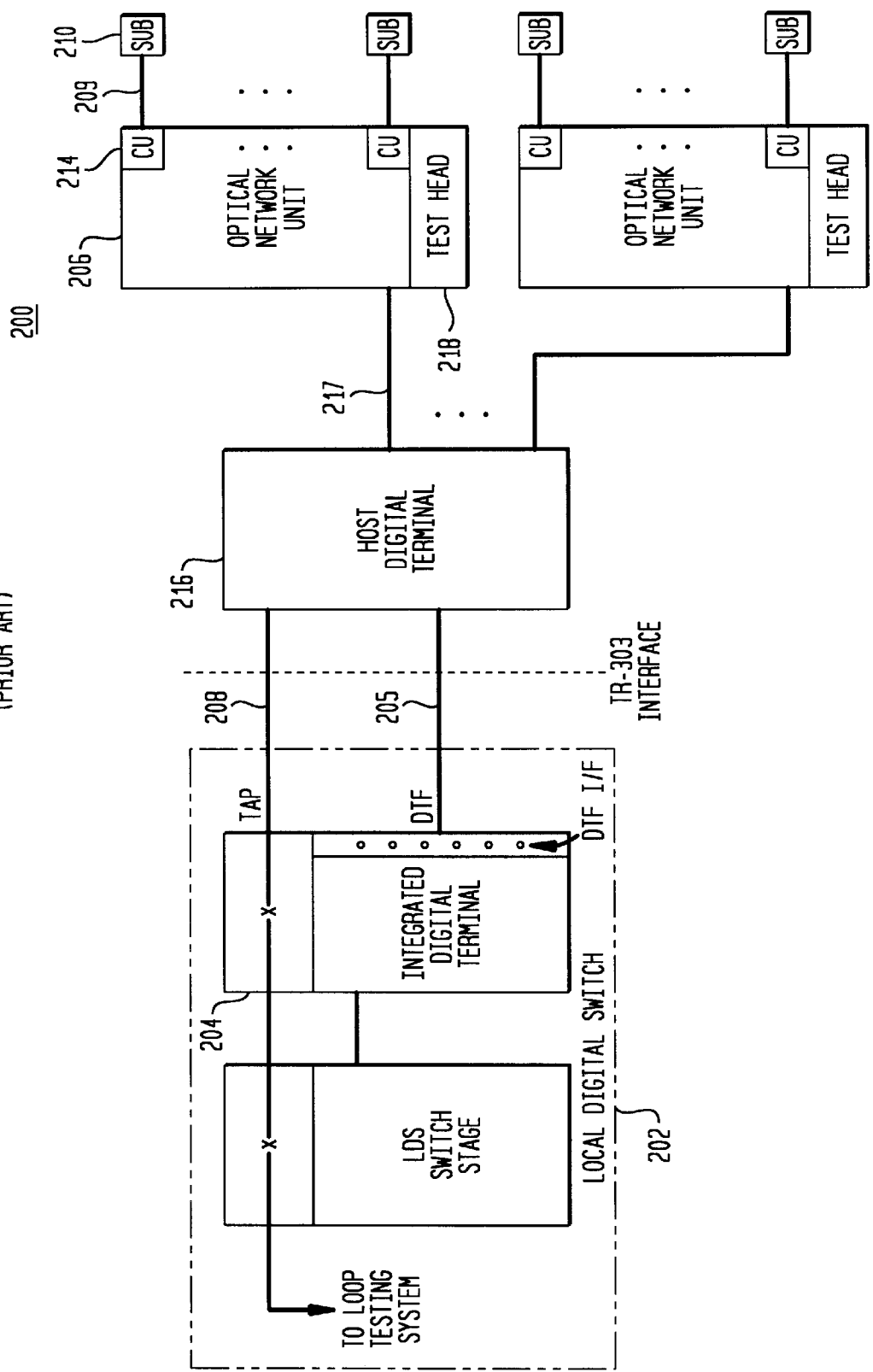
FIG. 2 shows a block diagram of a fiber-to-the-curb system.

(2) Optional test of the test path between the local digital switch and the TAP expander. The local digital switch "thinks" it is interacting with a remote digital terminal, but this is at the control level only. Measurements are made to the TAP expander. This makes the TAP expander transparent to the local digital switch and allows loop testing to be performed using the conventional method of the IDLC model of FIG. 1, as described earlier in the section entitled "Loop Testing in an IDLC System."

The local digital switch runs a diode test to determine the integrity of the test path between it and the TAP expander. In response to the request for the diode test from the local digital switch, the host digital terminal directs (over the communication link 419 to the TAP expander) the TAP expander to terminate the local digital switch TAP with a diode/resistor circuit. The local digital switch recognizes this termination, thus determining that the TAP connection to the TAP expander is intact.

The local digital switch then sends a message to the host digital terminal to release the diode/resistor termination from the TAP. The host digital terminal directs the TAP expander to remove the diode/resistor termination from the local digital switch TAP, thus completing the diode test.

(3) When the local digital switch sends a message to the host digital terminal to begin the setup sequence for the test path (alerting the host digital terminal of a test request), the host digital terminal sends a test request alert message to the ONU (306) that hosts the subscriber loop (309) to be tested. This ONU applies the diode/resistor termination across the derived TAP to its cluster. A scanner/detector circuit 430 in the TAP expander detects the diode/resistor termination and connects the incoming local digital switch TAP to the derived TAP expander output for the cluster containing the ONU with the loop under test. The scanner/detector circuit of the TAP expander also inhibits the other derived TAPs from being connected to the local digital switch TAP.

(4) When the local digital switch sends a message to the host digital terminal to connect the test access path, the host digital terminal instructs the ONU that serves the loop to be tested to remove the diode/resistor termination and provide a connection from the derived TAP to the channel unit under test (414) and to instruct the channel unit to connect the derived TAP to the subscriber loop. This completes the test path from the loop testing system to subscriber 310.

(5) The loop testing system now runs its loop tests following conventional procedures, as described earlier in the section entitled "Loop Testing in an IDLC System."

(6) After completion of the loop tests, the local digital switch sends a message to the host digital terminal to disconnect the test access path.

(7) The host digital terminal instructs the ONU to release the derived TAP expander connection to the channel unit and to instruct the channel unit to disconnect the subscriber loop from the derived TAP and to reconnect the subscriber loop to the channel unit's line circuit. The host digital terminal also directs the TAP expander to release the connection from the incoming local digital switch TAP to the derived TAP going to the ONU cluster. The TAP expander returns all derived TAPs to the scan/detect state. This completes the loop test session.

Although the present invention is described in FIGS. 3 and 4 in the context of a fiber-to-the-curb architecture having non-collocated ONU clusters, it will be understood that the present invention can also be implemented in other architectures supporting clustered ONUs or other types of clustered network units. In general, the present invention can be implemented as a TAP expander for any communication system having a central switch (e.g., the integrated digital terminal of a local digital switch) with at least one test access path in order to expand the capability of at least one of the test access paths to support loop testing with two or more non-collocated clusters of network units.

The present invention allows a central switch with as few as one test access path to be configured in a communication network having two or more non-collocated network unit clusters (e.g., ONU clusters), thereby supporting loop testing for all subscriber loops supported by the central switch without unnecessarily limiting the number of those subscriber loops.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A test access path (TAP) expander for supporting loop testing in a communication system, wherein:

the TAP expander is adapted to interface with a metallic TAP of a central switch of the communication system;

the TAP expander is adapted to interface with two or more network unit clusters of the communication system, wherein each network unit cluster comprises one or more network units; and the TAP expander is adapted to provide a metallic connection from the metallic TAP of the central switch to any one of the network unit clusters for loop testing.

2. The invention of claim 1, wherein control over the loop testing is implemented by a loop testing system that is unaware of the existence of the TAP expander and the existence of more than one network unit cluster.

3. The invention of claim 2, wherein the central switch is unaware of the existence of the TAP expander and the existence of more than one network unit cluster.

4. The invention of claim 1, wherein the central switch is unaware of the existence of the TAP expander and the existence of more than one network unit cluster.

5. The invention of claim 1, wherein the TAP expander automatically connects the metallic TAP of the central switch with a network unit cluster on which loop testing is to be performed.

6. The invention of claim 5, wherein the TAP expander detects a diode/resistor termination from the network unit cluster on which loop testing is to be performed and connects the network unit cluster to the metallic TAP of the central switch.

7. The invention of claim 1, wherein the communication system is a fiber-to-the-curb system and each network unit cluster is a cluster of one or more collocated optical network units.

8. The invention of claim 1, wherein:
the communication system is a fiber-to-the-curb system;
each network unit cluster is a cluster of one or more collocated optical network units;
control over the loop testing is implemented by a loop testing system that is unaware of the existence of the TAP expander and the existence of more than one network unit cluster;
the central switch is unaware of the existence of the TAP expander and the existence of more than one network unit cluster; and
the TAP expander automatically connects the metallic TAP of the central switch with a network unit cluster on which loop testing is to be performed, wherein the TAP expander detects a diode/resistor termination from the network unit cluster to select the network unit cluster for loop testing.

9. A communication system, comprising:
(a) a central switch having at least one metallic test access path (TAP);
(b) a TAP expander, connected to the metallic TAP of the central switch; and
(c) two or more network unit clusters connected to the TAP expander, wherein each network unit cluster comprises one or more network units and the TAP expander is adapted to provide a metallic connection from the metallic TAP of the central switch to any one of the network unit clusters for loop testing.

10. The invention of claim 9, wherein control over the loop testing is implemented by a loop testing system that is unaware of the existence of the TAP expander and the existence of more than one network unit cluster.

11. The invention of claim 10, wherein the central switch is unaware of the existence of the TAP expander and the existence of more than one network unit cluster.

12. The invention of claim 9, wherein the central switch is unaware of the existence of the TAP expander and the existence of more than one network unit cluster.

13. The invention of claim 9, wherein the TAP expander automatically connects the metallic TAP of the central switch with a network unit cluster on which loop testing is to be performed.

14. The invention of claim 13, wherein the TAP expander detects a diode/resistor termination from the network unit cluster on which loop testing is to be performed and connects the network unit cluster to the metallic TAP of the central switch.

15. The invention of claim 9, wherein the communication system is a fiber-to-the-curb system and each network unit cluster is a cluster of one or more collocated optical network units.

16. The invention of claim 9, wherein:
the communication system is a fiber-to-the-curb system;
each network unit cluster is a cluster of one or more collocated optical network units;
control over the loop testing is implemented by a loop testing system that is unaware of the existence of the TAP expander and the existence of more than one network unit cluster;
the central switch is unaware of the existence of the TAP expander and the existence of more than one network unit cluster; and
the TAP expander automatically connects the metallic TAP of the central switch with a network unit cluster on which loop testing is to be performed, wherein the TAP expander detects a diode/resistor termination from the network unit cluster to select the network unit cluster for loop testing.

17. A test access path (TAP) expander for supporting loop testing in a communication system, the TAP expander comprising:
(a) a central-switch TAP interface adapted to interface with a TAP of a central switch of the communication system;
(b) a plurality of derived TAP interfaces, each adapted to interface with a different one of a plurality of non-collocated network unit clusters of the communication system; and
(c) a switch adapted to connect the central-switch TAP interface to any one of the derived TAP interfaces in order to connect the TAP of the central switch with any one of the network unit clusters for loop testing.

18. The invention of claim 17, wherein the TAP expander further comprises a scanner/detector circuit adapted to scan each of the derived TAP interfaces to detect the presence of a diode/resistor termination indicative of loop testing, wherein the switch connects the central-switch TAP interface to the derived TAP interface corresponding to the diode/resistor termination.

19. The invention of claim 17, wherein control over the loop testing is implemented by a loop testing system that is unaware of the existence of the TAP expander and the existence of more than one network unit cluster.

20. The invention of claim 19, wherein the central switch is unaware of the existence of the TAP expander and the existence of more than one network unit cluster.

21. The invention of claim 17, wherein the central switch is unaware of the existence of the TAP expander and the existence of more than one network unit cluster.

22. The invention of claim 17, wherein the TAP expander automatically connects the TAP of the central switch with a network unit cluster on which loop testing is to be performed.

23. The invention of claim 17, wherein the communication system is a fiber-to-the-curb system and each network unit cluster is a cluster of collocated optical network units.

24. The invention of claim 17, wherein:
the communication system is a fiber-to-the-curb system;
each network unit cluster is a cluster of collocated optical network units;
the TAP expander further comprises a scanner/detector circuit adapted to scan each of the derived TAP interfaces to detect the presence of a diode/resistor termination indicative of loop testing, wherein the switch connects the central-switch TAP interface to the derived TAP interface corresponding to the diode/resistor termination;
control over the loop testing is implemented by a loop testing system that is unaware of the existence of the TAP expander and the existence of more than one network unit cluster; and
the central switch is unaware of the existence of the TAP expander and the existence of more than one network unit cluster.

25. A test access path (TAP) expander for supporting loop testing in a communication system, wherein:
  the TAP expander is adapted to interface with a TAP of a central switch of the communication system;
  the TAP expander is adapted to interface with two or more network unit clusters of the communication system, wherein each network unit cluster comprises one or more network units; and
  the TAP expander is adapted to connect the TAP of the central switch with any one of the network unit clusters for loop testing, wherein the TAP expander automatically connects the TAP of the central switch with a network unit cluster on which loop testing is to be performed.

26. The invention of claim 25, wherein the TAP expander detects a diode/resistor termination from the network unit cluster on which loop testing is to be performed and connects the network unit cluster to the TAP of the central switch.

27. A communication system, comprising:
  (a) a central switch having at least one test access path (TAP);
  (b) a TAP expander, connected to the TAP of the central switch; and
  (c) two or more network unit clusters connected to the TAP expander, wherein:
    each network unit cluster comprises one or more network units;
    the TAP expander is adapted to connect the TAP of the central switch with any one of the network unit clusters for loop testing; and
    the TAP expander automatically connects the TAP of the central switch with a network unit cluster on which loop testing is to be performed.

28. The invention of claim 27, wherein the TAP expander detects a diode/resistor termination from the network unit cluster on which loop testing is to be performed and connects the network unit cluster to the TAP of the central switch.

29. A test access path (TAP) expander for supporting loop testing in a communication system, the TAP expander comprising:
  (a) a central-switch TAP interface adapted to interface with a TAP of a central switch of the communication system;
  (b) a plurality of derived TAP interfaces, each adapted to interface with a different one of a plurality of network unit clusters of the communication system, wherein each network unit cluster comprises one or more network units; and
  (c) a switch adapted to connect the central-switch TAP interface to any one of the derived TAP interfaces in order to connect the TAP of the central switch with any one of the network unit clusters for loop testing.

30. The invention of claim 29, wherein the TAP expander further comprises a scanner/detector circuit adapted to scan each of the derived TAP interfaces to detect the presence of a diode/resistor termination indicative of loop testing, wherein the switch connects the central-switch TAP interface to the derived TAP interface corresponding to the diode/resistor termination.

31. The invention of claim 29, wherein control over the loop testing is implemented by a loop testing system that is unaware of the existence of the TAP expander and the existence of more than one network unit cluster.

32. The invention of claim 29, wherein the central switch is unaware of the existence of the TAP expander and the existence of more than one network unit cluster.

33. The invention of claim 29, wherein the TAP expander automatically connects the TAP of the central switch with a network unit cluster on which loop testing is to be performed.

* * * * *